United States Patent
Glemarec et al.

(10) Patent No.: US 12,240,618 B2
(45) Date of Patent: Mar. 4, 2025

(54) TURBOJET ENGINE FAN CASING

(71) Applicant: SAFRAN AIRCRAFT ENGINES, Paris (FR)

(72) Inventors: Guillaume Glemarec, Paris (FR); Quentin Matthias Emmanuel Garnaud, Paris (FR); Frédéric Dautreppe, Paris (FR)

(73) Assignee: Safran Aircraft Engines, Paris (FR)

( * ) Notice: Subject to any disclaimer, the term of this patent is extended or adjusted under 35 U.S.C. 154(b) by 0 days.

(21) Appl. No.: 17/549,291

(22) Filed: Dec. 13, 2021

(65) Prior Publication Data

US 2022/0106049 A1  Apr. 7, 2022

Related U.S. Application Data

(63) Continuation of application No. PCT/EP2020/064762, filed on May 27, 2020.

(30) Foreign Application Priority Data

Jun. 12, 2019 (FR) ..................... 19/06245

(51) Int. Cl.
  *B64D 29/06* (2006.01)
  *F02K 1/82* (2006.01)
  *F02K 3/06* (2006.01)
  *B64D 27/16* (2006.01)

(52) U.S. Cl.
  CPC .............. *B64D 29/06* (2013.01); *F02K 1/827* (2013.01); *F02K 3/06* (2013.01); *B64D 27/16* (2013.01); *F05D 2220/36* (2013.01)

(58) Field of Classification Search
  CPC ......... B64D 27/16; B64D 29/06; F02K 1/827; F02K 3/06; F05D 2220/36
  See application file for complete search history.

(56) References Cited

U.S. PATENT DOCUMENTS

| | | | | |
|---|---|---|---|---|
| 2,063,013 A | * | 12/1936 | Cooper | B65D 7/46 |
| | | | | D9/557 |
| 3,542,152 A | * | 11/1970 | Oxx, Jr. | B64D 33/02 |
| | | | | 415/200 |
| 4,055,041 A | * | 10/1977 | Adamson | F01D 11/08 |
| | | | | 415/196 |

(Continued)

FOREIGN PATENT DOCUMENTS

| | | |
|---|---|---|
| EP | 1104837 | 6/2001 |
| FR | 2961483 | 12/2011 |

(Continued)

OTHER PUBLICATIONS

International Search Report for International Application PCT/EP2020/064762, mailed Jul. 23, 2020.

*Primary Examiner* — Lorne E Meade
(74) *Attorney, Agent, or Firm* — Burris Law, PLLC

(57) ABSTRACT

A fan casing for an aircraft bypass turbojet engine includes one single wall configured to form at least one portion of an outer skin of a nacelle. The wall includes at least one reinforcement for stiffening the fan casing. The reinforcement is formed by a portion of the wall forming at least one annular area projecting towards an inside of the nacelle and/or having an overthickness. The reinforcement is further configured for fastening the fan casing to arms crossing a secondary stream flow path of the turbojet engine.

8 Claims, 2 Drawing Sheets

(56) References Cited

U.S. PATENT DOCUMENTS

| | | | | |
|---|---|---|---|---|
| 6,290,455 B1* | 9/2001 | Hemmelgarn | ........ | F01D 21/045 |
| | | | | 415/174.4 |
| 6,360,989 B1* | 3/2002 | Maguire | ................ | B64D 33/02 |
| | | | | 244/53 B |
| 8,220,588 B2* | 7/2012 | Thrash | ...................... | F02K 3/06 |
| | | | | 181/290 |
| 8,616,834 B2* | 12/2013 | Knight, III | .............. | F01D 25/12 |
| | | | | 415/176 |
| 8,752,795 B2* | 6/2014 | Stewart, III | ........... | B64D 33/02 |
| | | | | 244/131 |
| 2008/0159856 A1 | 7/2008 | Moniz et al. | | |
| 2010/0111685 A1 | 5/2010 | Sjunnesson et al. | | |
| 2014/0144151 A1* | 5/2014 | Bifulco | ................ | F01D 25/002 |
| | | | | 29/888.011 |

FOREIGN PATENT DOCUMENTS

| | | |
|---|---|---|
| FR | 2980241 | 3/2013 |
| FR | 3069229 | 1/2019 |

\* cited by examiner

TURBOJET ENGINE FAN CASING

CROSS-REFERENCE TO RELATED APPLICATIONS

This application is a continuation of International Application No. PCT/EP2020/064762, filed on May 27, 2020, which claims priority to and the benefit of FR 19/06245 filed on Jun. 12, 2019. The disclosures of the above applications are incorporated herein by reference.

FIELD

The present disclosure relates to a fan casing, and more particularly to an aircraft turbojet engine comprising the fan casing.

BACKGROUND

The statements in this section merely provide background information related to the present disclosure and may not constitute prior art.

A nacelle generally has an aerodynamic structure configured to streamline a turbojet engine. The nacelle extends along a longitudinal axis and comprises an air inlet upstream of the engine, a middle section accommodating thrust reversal means, and generally terminates in an ejection nozzle whose outlet is located downstream of the turbojet engine. The terms engine and turbojet engine refer to the same object.

A thrust reverser is a device that allows directing the air stream generated by the turbojet engine forwards, which allows shortening the landing distance and limiting the load on the brakes at the level of the landing gears.

Most modern technologies use bypass turbojet engines. In these turbojet engines, a hot air stream, called primary stream, and a cold air stream, called secondary stream, are generated via the vanes of the fan.

The cold air second stream circulates outside the turbojet engine through an annular passage called flow path. The flow path being formed between a fairing of the turbojet engine and the inner wall of the nacelle.

The middle structure usually comprises one or several fan cowl(s) surrounding a fan casing of the turbojet engine. The fan casing has a generally cylindrical shape.

The fan of the turbojet engine consists of a rotary bladed wheel comprising a plurality of fan vanes rotatably mounted relative to a fixed hub connected to the fan casing by a plurality of fixed arms.

The internal surface of the fan casing is lined with an abradable surface allowing sealing with regards to the fan vanes.

Downstream of the fan, there are stream straightening vanes, also called OGV ("Outlet Guide Vanes") allowing straightening of the secondary stream generated by the fan.

Because of the structural nature of the OGV, the fan casing has considerable weight. In addition, the integration of such a fan casing into the nacelle poses difficulties.

A solution known from patent FR 2 961 483 consists in using a fan casing having a box shape, whose inner wall is adapted to form the inner skin of the cold air flow path of a nacelle inside which the turbojet engine is configured to be mounted, and whose outer wall is adapted to form the outer skin of the nacelle. Such a fan casing is not advantageously arranged. That is, the box structure forming the thickness of the nacelle does not allow use of the space that could be enclosed by the box and therefore some inner volume is lost.

In addition, today's aircrafts need to increase the surfaces or volumes of acoustic panels in order to limit the noise disturbances generated by the propulsion unit formed by the turbojet engine and its nacelle, while preserving the structural capability of the fan casing. However, the box structure does not allow increasing the surface of the acoustic panels by the delimitation of the box-shaped fan casing. Finally, such a fan casing has considerable weight as well as a large number of parts.

SUMMARY

This section provides a general summary of the disclosure and is not a comprehensive disclosure of its full scope or all of its features.

The present disclosure provides a bypass fan casing, comprising one single wall configured to form at least one portion of an outer skin of a nacelle. The wall comprises at least one reinforcement for stiffening the fan casing. The reinforcement being formed by a portion of the wall forming at least one annular area projecting towards the inside of the nacelle and/or having an overthickness. The reinforcement being further configured for fastening of the fan casing to arms crossing a secondary stream flow path of the turbojet engine.

Such a fan casing having one single wall to form at least one portion of the outer skin of the nacelle reduces the weight of the set formed by the fan casing and the other elements of the nacelle. Furthermore, as the fan casing combines the structural function of a conventional fan casing with the aerodynamic function of a conventional nacelle, in particular concerning the aerodynamic outer skin, the number of parts constituting the nacelle integrating this fan casing is reduced.

In one form, the unique wall of the fan casing being coincident with the outer skin of the nacelle increases the internal volume of the fan casing.

In another form, the reinforcement allows the fan casing to fasten to structural arms connected to other portions of the engine, in particular to a fixed hub, while providing its structural function.

In yet another form, the reinforcement extends annularly and has a longitudinal cross-sectional profile substantially similar to a W or to a U. These shapes allow the fan casing to receive the elements to be fastened to the fan casing at the desired locations. In addition, these different shapes improve stiffness on the fan casing.

In one form, a reinforcement having a U-shaped longitudinal cross-sectional profile is configured to surround the fan.

In another form, a reinforcement configured for fastening of the fan casing to arms has a W-shaped longitudinal cross-sectional profile.

In yet another form, the reinforcement forms at least one corresponding cavity opening onto the outer skin. The cavity improves the arrangement of the fan casing, for example, by filling the cavity with at least one equipment of the propulsion unit.

In one form, the cavity is configured to be covered by a cowl, a panel or a closure hatch. The cowl, the panel or the closure hatch improves the aerodynamism of the fan casing of the nacelle by covering the cavity.

In another form, the cowl, the panel or the closure hatch is removable. The removability of the cowl, the panel or the closure hatch allows switching easily from a position where the cowl, the panel or the closure hatch does not cover the cavity, allowing access to cavity into a position where the cowl, the panel or the closure hatch covers the at least one cavity, forming an aerodynamic line at the level of the cavity.

In yet another form, the cavity is configured to receive at least one equipment of the propulsion unit.

The present disclosure also provides an aircraft turbojet engine comprising a fan casing having at least one feature disclosed above.

In one form, the arms crossing the secondary stream flow path of the turbojet engine and to which the reinforcement of the fan casing is fastened comprise stream straightening vanes.

The present disclosure also provides a nacelle comprising a fan casing having at least one feature disclosed above.

In one form, the nacelle comprises acoustic panels supported by inner surfaces of the unique wall of the fan casing. The acoustic panels form at least one portion of an inner skin of the nacelle that externally delimits the secondary stream flow path of the turbojet engine. It should be understood that the fan casing forms at least one portion of the outer skin of the nacelle and of the wall of the turbojet engine.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
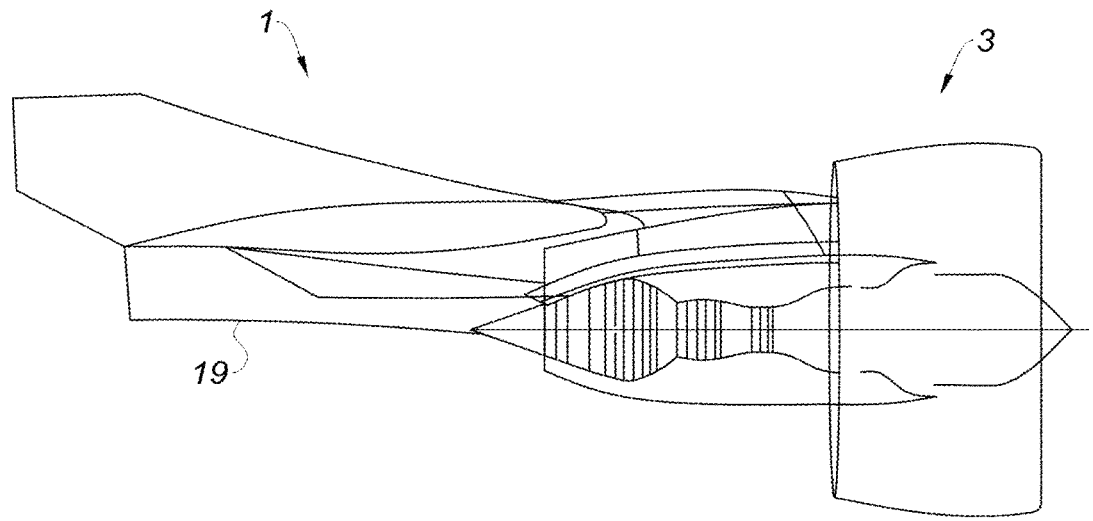
FIG. 1 is a partial perspective view of a propulsion unit fastened to a wing of an aircraft according to the prior art.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows a wing 1 supporting a propulsion unit comprising a nacelle 3. The nacelle 3 surrounds in particular a fan casing. A mast 19, also called pylon, has one end fastened beneath the wing 1, and an opposite end configured to support the propulsion unit.

Figure 2:
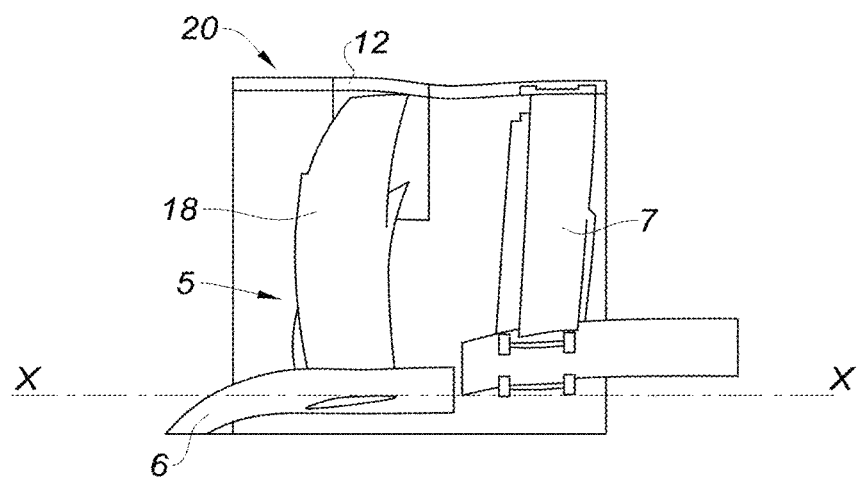
FIG. 2 is a partial perspective view of a fan comprising vanes and stream straightening vanes according to the prior art.

FIG. 2 shows in detail a portion of a turbojet engine comprising a fan 5 and structural arms which may be formed by stream straightening vanes 7 surrounded by the fan casing 20. In this example, vanes 18 of the fan 5 are fastened to a rotary hub 6. The fan 5 allows the generation of the primary and secondary streams. The hub 6 is configured to be rotating about a longitudinal axis XX. An abradable coating 12 lines the internal surface of the fan casing 20 opposite the fan vanes 18 so as to make the fan casing 20 tight but also to inhibit wear of the fan 5 in case of contact between the fan vanes 18 and the fan casing 20. The stream straightening vanes 7 allow straightening the secondary stream generated by the fan 5. At least some of these stream straightening vanes 7 may have enough stiffness to provide a structural function in the connection between the fan casing 20 and other portions of the engine, in particular a fixed hub.

Figure 3:
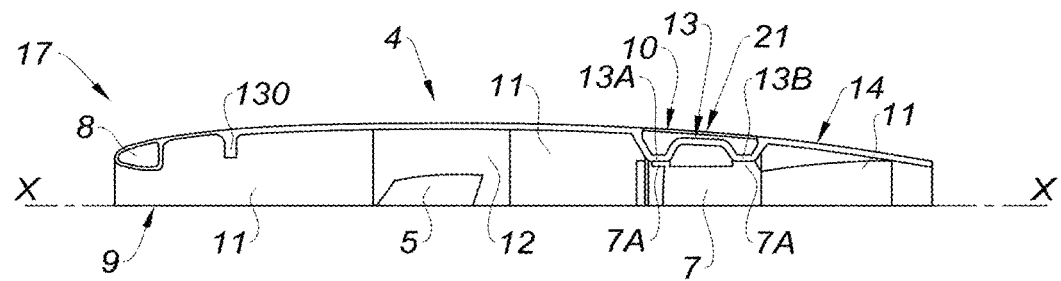
FIG. 3 is a partial cross-sectional view of a nacelle integrating a fan casing according to the principles of the present disclosure.

FIG. 3 shows a cross-sectional view of a portion of a nacelle 17 formed by a fan casing 4 according to the present disclosure. The nacelle 17 is delimited by an outer skin which is in contact with air outside the nacelle. The fan casing 4 has one single wall 14 which forms at least partially the outer skin of the nacelle 17.

The wall 14 comprises enough stiffness to provide the structural function of the fan casing 4 of the nacelle 17 and fasten elements to the fan casing 4.

An air inlet lip 8 is composed by a leading edge. The leading edge could be configured to receive a deicing means. The air inlet lip 8 may be integral with or attached to the nacelle 17. Following the air inlet lip 8, in the direction of the air flow through the nacelle 17, is the air inlet flow path 9. The air inlet flow path 9 comprises acoustic elements such as acoustic panels 11 so as to limit the noise diffused by the propulsion unit. The fan casing 4 is coincident with at least one portion of the outer skin of the nacelle 17.

The fan casing 4 surrounds a fan 5 providing the secondary air stream. An abradable coating 12 lines the internal surface of the fan casing 4 opposite the fan vanes so as to make the fan casing 4 tight but also to inhibit wear of the fan 5 in case of contact between the fan vanes and the fan casing 4. The fan casing 4 also supports acoustic elements such as acoustic panels 11.

The acoustic panels 11 are fastened to the inner wall of the fan casing 4, or to at least one inner removable cowl (not shown) of the nacelle 17 which seals at least one inner cavity (not shown) formed by the fan casing 4. The acoustic panels 11 extend beyond the stream straightening vanes 7 up to a downstream end portion of the nacelle 17, and form at least partially the inner skin of the cold air flow path. Over most of the inner wall of the fan casing 4, the depth available to house the acoustic panels 11 is larger than that available in the nacelles of the prior art.

Opposite these stream straightening vanes 7, a reinforcement 13 of the fan casing 4 of the nacelle 17 allows fastening to the fan casing 4 the straightening vanes 7 or any other arms having a structural function in the connection between the fan casing 4 and a fixed hub of the turbojet engine. The stream straightening vanes 7 may form structural arms having enough stiffness to provide the structural function. In one example, the bladed wheel that comprises the stream straightening vanes 7 may also comprise structural arms with a larger section, having, or not, a profile for straightening the stream.

The reinforcement 13, which has W-shaped longitudinal section in the represented example, forms an outer cavity 10 directed towards the outside of the nacelle 17. The outer cavity 10 is opposite the stream straightening vanes 7.

The reinforcement 13 follows the wall 14 of the fan casing 4 of the nacelle 17, and therefore the outer skin of the nacelle 17, in the direction of the air flow through the nacelle 17 until arriving at the level of the outer cavity 10. In other words, the reinforcement 13 delimits an outer cavity 10 with a longitudinal section substantially similar to a W. The W-shape opening onto the outside of the nacelle 17.

Upon completion of the delimitation of the outer cavity 10, the reinforcement 13 is again coincident with the outer skin of the nacelle 17, in the direction of the air flow through the nacelle 17. The reinforcement 13 has a structural function for the strength of the fan casing 4 of the nacelle 17, and more particularly its wall 14.

The outer cavity 10 allows accessing a portion 13A, 13B of the reinforcement 13 that accommodates fastening means of the stream straightening vanes or arms 7 or any other arm having a structural function. Indeed, the reinforcement 13 is configured for fastening of the fan casing 4 to arms at least part of which has enough stiffness to provide a structural connection between the fan casing 4 and other structural portions of the engine. These structural connecting arms may be totally formed by the stream straightening vanes 7. The configuration of the reinforcement 13 to accommodate the fastening means of the arms 7 may consist in providing for orifices across the thickness of the reinforcement 13, so as to accommodate fastening bolts of the arms. The arms 7 may comprise at their tips fastening areas 7A also provided with orifices for accommodating the fastening bolts of the arms.

A cowl 21, whether structural or non-structural, is configured to removably cover the outer cavity 10 so as to form the outer aerodynamic line of the nacelle 17 at the level of the outer cavity 10.

When the removable cowl 21 does not cover the outer cavity 10, an access is allowed for a user to access the fastening means of the stream straightening vanes 7.

The reinforcement 13 does not necessarily project significantly towards the inside of the nacelle.

Alternatively, or in combination with a projection towards the inside of the nacelle 17, the reinforcement 13 may be made by a local overthickness 130 of the wall 14, which may form a substantially pronounced boss towards the inside of the nacelle 17.

Figure 4:
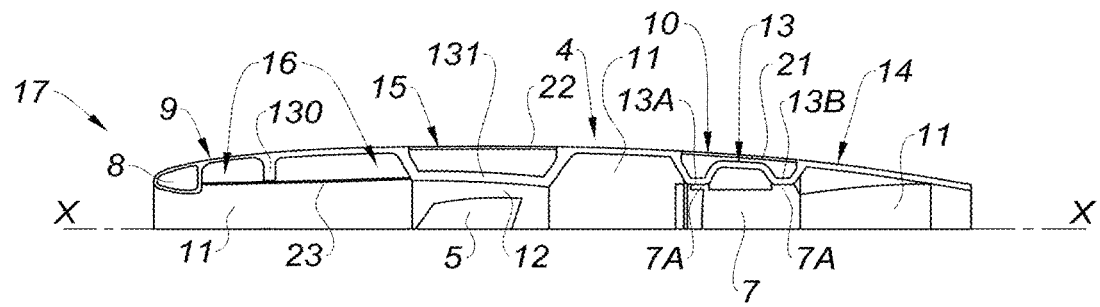
FIG. 4 is a partial cross-sectional view of a nacelle integrating a fan casing according to another form.

FIG. 4 shows a cross-sectional view of a portion of a nacelle 17 integrating a fan casing 4 according to another variant of the present disclosure. The nacelle 17 is also delimited by an outer skin. Similar to the nacelle of FIG. 3, the wall 14 has enough stiffness to provide the structural function of the fan casing 4 and to fasten therein elements for connection to other structural portions of the engine. The nacelle 17 is composed by the same elements as the nacelle 17 of FIG. 3.

In this example, a structural reinforcement 131 is introduced opposite the fan vanes. The reinforcement 131 comprises a cavity 15 directed towards the outside of the nacelle 17. The cavity 15 has U-shaped longitudinal cross-section.

The reinforcement 131 of the fan casing 4 is directed locally towards the inside of the nacelle 17 in order to fasten the abradable material 12 on the fan casing 4. The U-shape of the reinforcement 131, in longitudinal section, confers additional stiffness on the fan casing 4, at the level of the fan 5. The outer cavity 15 may also accommodate an equipment of the propulsion unit.

A cowl 22, whether structural or non-structural, is configured to cover the outer cavity 15, like the cowl 21 of the outer cavity 10, in a removable manner, to form the outer aerodynamic line of the nacelle 17 at the level of the outer cavity 15 and the outer cavity 10.

The internal volume of each of the cavities is then accessible to an operator when the corresponding cowl 21, 22 is removed.

Furthermore, at least one inner removable cowl 23, covered by an acoustic panel 11, is configured to cover at least one cavity 16, configured to receive equipment of the propulsion unit. The cowl 23, and a fortiori the at least one cavity 16, is accessible through the air inlet of the nacelle 17.

The present disclosure allows arranging a nacelle 17 in an improved manner in order to reduce the overall weight thereof by sharing the functions of the nacelle 17 and of the fan casing 4. That is, the fan casing 4 and the nacelle 17 share the same wall 14. In addition, the outer cavities 10, 15 are integrated into the fan casing 4 to form structural reinforcements and form compartments that could receive equipment, and the outer aerodynamic line of the nacelle 17 is formed by the removable cowls 21, 22. The reinforcements 13, 131 respectively forming the outer cavities 10 and 15 allow fastening and/or supporting elements such as the stream straightening vanes 7 and an abradable coating 12, but also other parts while stiffening the fan casing 4. This arrangement of the nacelle 17 also allows increasing the treated acoustic surfaces/volumes in order to increase the noise reduction capacity.

Of course, all simple modifications or combinations of elements derived from different variants of the present disclosure fall within the scope of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A fan casing for an aircraft bypass turbojet engine, the fan casing comprising:
    one single wall including a main portion, a rear end portion, and at least one reinforcement extending from the main portion to the rear end portion, the at least one reinforcement removably covered by a movable cowl of a nacelle, the one single wall having an inner surface and an outer surface that define a thickness of the main portion, the main portion extending from an air inlet lip to the at least one reinforcement,
    wherein the air inlet lip, the main portion, the movable cowl of the nacelle, and the rear end portion jointly form a continuous aerodynamic line when the at least one reinforcement is covered by the movable cowl, the at least one reinforcement configured to stiffen the fan casing, the at least one reinforcement extending inwardly from the inner surface of the main portion to form at least one annular area projecting towards an inside of the nacelle, an inwardly extending portion of the at least one reinforcement configured to fasten the fan casing to a plurality of fixed arms crossing a secondary stream flow path of the aircraft bypass turbojet engine,
    wherein the at least one reinforcement continuously extends from a rear end of the main portion, is recessed from the outer surface of main portion, and forms at least one cavity exposed from the nacelle and opening outside the nacelle when the movable cowl is moved to uncover the at least one reinforcement.

2. The fan casing according to claim 1, wherein the at least one reinforcement extends annularly and has a longitudinal cross-sectional profile substantially similar to a W or U shape.

3. The fan casing according to claim 2, wherein another reinforcement having a U-shaped longitudinal cross-sectional profile is configured to surround a fan.

4. The fan casing according to claim 2, wherein the at least one reinforcement configured for fastening the fan casing to the plurality of fixed arms has a W-shaped longitudinal cross-sectional profile.

5. An aircraft bypass turbojet engine comprising the fan casing according to claim 1.

6. The aircraft bypass turbojet engine according to claim 5, wherein the plurality of fixed arms crossing the secondary stream flow path of the aircraft bypass turbojet engine and to which the at least one reinforcement of the fan casing is fastened comprise stream straightening vanes.

7. A nacelle comprising:
an air inlet lip;
a fan casing including one single wall including a main portion, a rear end portion, and at least one reinforcement extending from the main portion to the rear end portion, the one single wall having an inner surface and an outer surface that define a thickness of the main portion, the main portion extending from the air inlet lip to the at least one reinforcement;
a movable cowl configured to removably cover the at least one reinforcement of the one single wall of the fan casing, wherein the air inlet lip, the main portion of the fan casing, the movable cowl of the nacelle, and the rear end portion of the fan casing jointly form a continuous aerodynamic line when the at least one reinforcement is covered by the movable cowl; and
acoustic panels supported by the inner surface of the one single wall of the fan casing,
wherein the at least one reinforcement is configured to stiffen the fan casing, the at least one reinforcement extending inwardly from the inner surface of the main portion of the one single wall to form at least one annular area projecting towards an inside of the nacelle, an inwardly extending portion of the at least one reinforcement configured to fasten the fan casing to a plurality of fixed arms crossing a secondary stream flow path of an aircraft bypass turbojet engine, the at least one reinforcement continuously extending from a rear end of the main portion, is recessed from the outer surface of the main portion, and forming at least one cavity exposed from the nacelle and opening outside the nacelle when the movable cowl is moved to uncover the at least one reinforcement.

8. A fan casing for an aircraft bypass turbojet engine, the fan casing comprising:
one single wall including a main portion, a rear end portion, and at least one reinforcement extending from the main portion to the rear end portion, the at least one reinforcement removably covered by a movable cowl of a nacelle, the one single wall having an inner surface and an outer surface that define a thickness of the main portion, the main portion extending from an air inlet lip to the at least one reinforcement,
wherein the air inlet lip, the main portion, the movable cowl of the nacelle, and the rear end portion jointly form a continuous aerodynamic line when the at least one reinforcement is covered by the movable cowl, the at least one reinforcement configured to stiffen the fan casing, the at least one reinforcement extending inwardly from the inner surface of the main portion towards an inside of the nacelle to define at least one annular area and to allow the fan casing to be fastened to a plurality of fixed arms crossing a secondary stream flow path of the aircraft bypass turbojet engine, the at least one reinforcement having a longitudinal cross-section substantially similar to a W or U shape,
wherein the at least one reinforcement continuously extends from a rear end of the main portion, is recessed from the outer surface of the main portion, and forms at least one cavity exposed from the nacelle and opening outside the nacelle when the movable cowl is moved to uncover the at least one reinforcement.

* * * * *